S. J. TILLEY.
WAGON END GATE.
APPLICATION FILED FEB. 7, 1911.
1,038,989.
Patented Sept. 17, 1912.
2 SHEETS—SHEET 1.
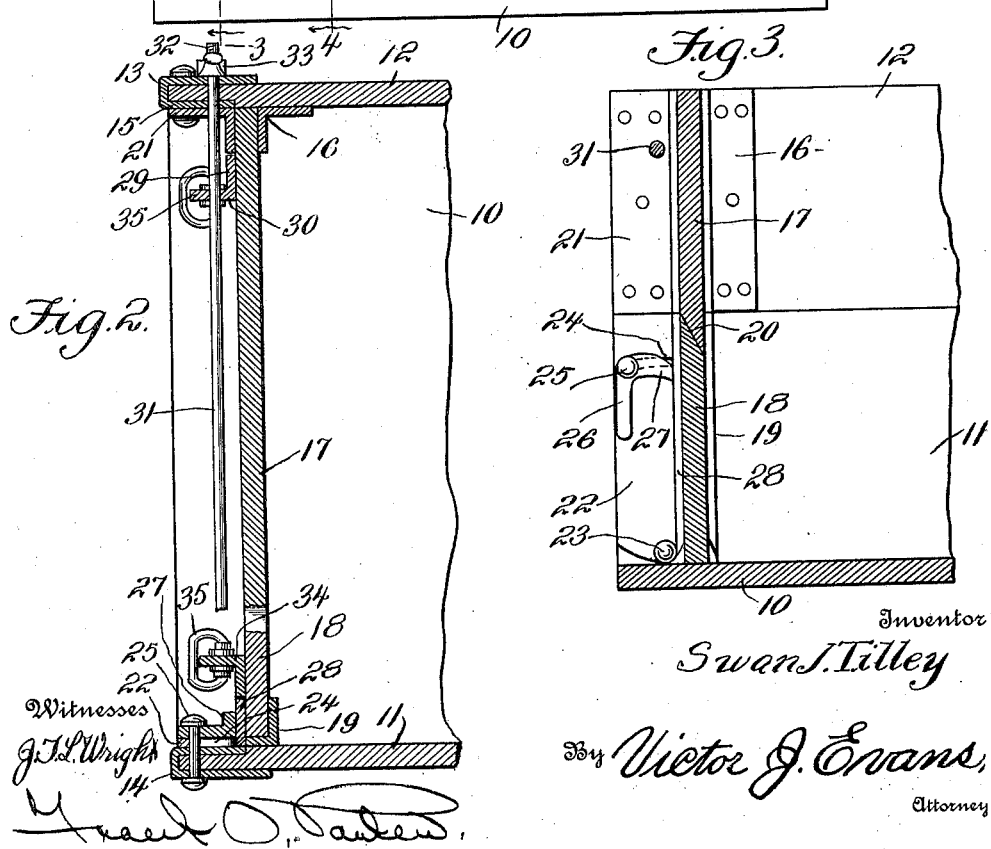

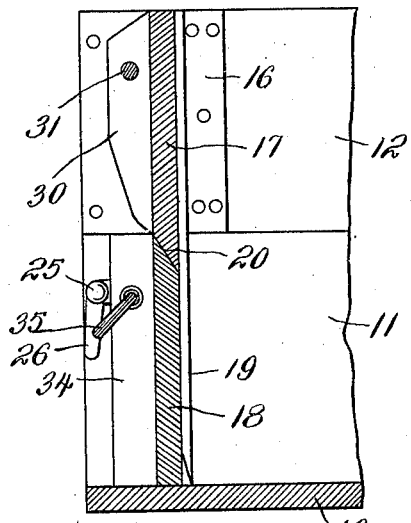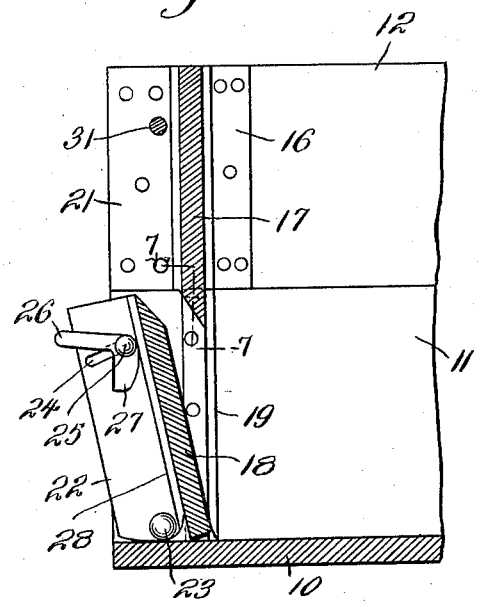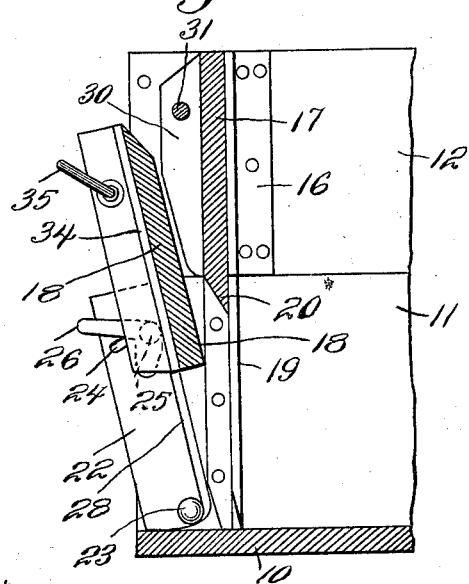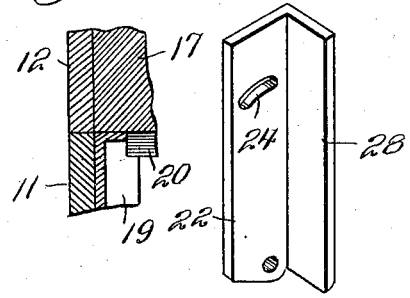

UNITED STATES PATENT OFFICE.

SWAN J. TILLEY, OF CHAPPELL, NEBRASKA.

WAGON END-GATE.

1,038,989.  Specification of Letters Patent.  Patented Sept. 17, 1912.

Application filed February 7, 1911. Serial No. 607,063.

*To all whom it may concern:*

Be it known that I, SWAN J. TILLEY, a citizen of the United States, residing at Chappell, in the county of Deuel and State of Nebraska, have invented new and useful Improvements in Wagon End-Gates; of which the following is a specification.

The invention relates to wagon boxes, and more particularly to end gates for wagon bodies or boxes.

The primary object of the invention is the provision of an end gate in which the separable sections thereof may be securely fastened in position between the side boards of a wagon body or box for closing the dumping end thereof, and that may be readily and easily removed, whereby a load within the box or body may be conveniently dumped or discharged therefrom.

Another object of the invention is the provision of an end gate of this character in which the top or bottom section thereof may be removed independently of the other, thus avoiding the detachment of both sections, when it is desired to unload the wagon box or body, although both of said sections are capable of detachment, should the occasion require.

A further object of the invention is the provision of a tail gate of this character in which the top and bottom sections thereof are constructed to overlap each other at their meeting edges, thus forming a tight joint therebetween when the said sections are fastened to a wagon box or body. Thus the load therein will be prevented from spilling when such wagon box or body is in motion.

A still further object of the invention is the provision of an end gate of this character which may be securely and quickly fastened to or removed from a wagon box or body.

A still further object of the invention is the provision of an end gate of the character described which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is an end elevation of a wagon box or body, showing the end gate mounted thereon and constructed in accordance with the invention. Fig. 2 is a sectional view on the line 2—2 of Fig. 1, looking in the direction of the arrow. Fig. 3 is a sectional view on the line 3—3 of Fig. 1, looking in the direction of the arrow. Fig. 4 is a sectional view on the line 4—4 of Fig. 1, looking in the direction of the arrow. Fig. 5 is a similar view to Fig. 3, showing the lower section of the end gate opened. Fig. 6 is a view similar to Fig. 4, showing the lower end gate section partially raised. Fig. 7 is a sectional view on the line 7—7 of Fig. 5. Fig. 8 is a perspective view of one of the swinging cleats.

Similar reference characters indicate corresponding parts throughout the several views of the drawings.

Referring to the drawings by numerals, 10 designates a wagon body having at opposite longitudinal edges of its bottom the usual side boards 11, and this body supports a top box, including side sections 12, the same being coextensive with the side boards 11 and rest upon the top edges thereof in the usual well-known manner. Mounted upon the side boards 11 and sections 12 of the top box are U-shaped members 13 and 14, the same being disposed near the upper edges of the said boards and sections 11 and 12, respectively, at the rear ends thereof. The members 13 and 14 have their inner ends or limbs 15 embedded in suitable recesses formed in the inner faces of the side boards and sections 11 and 12, so that they will lie flush with the inner faces thereof.

Secured to the inner faces of the sections 12 of the top box spaced from the rear ends thereof are angle irons 16, the same being arranged vertically and form cleats against which abuts the upper removable section 17 of an end gate, which includes a lower detachable section 18, the same abutting against cleats 19 secured vertically to the inner faces of the side boards 11 spaced from the rear end of the wagon body, the sections 17 and 18 of the end gate at their inner meeting edges being correspondingly beveled, as at 20, so that when the said end gate is closed, the beveled edges will overlap each other and form a tight joint therebetween, as is clearly shown in Figs. 3 and 4 of the drawings. Secured to the outer and inner faces of the sections 12 of the top box, spaced from the cleats, 16, are stationary guide cleats 21, between which and the said cleats 16 is slidably fitted the upper section 17 of the end gate. Spaced from the cleats 19 secured to the side boards 11 of the wagon body and disposed against the inner faces of said boards 11 are outwardly and rearwardly swinging clamping cleats 22, the latter being connected to the said boards 11 by means of pivots 23 passed through the lower ends of the said cleats and the said boards 11 close to the bottom of the body of the wagon. These clamping cleats 22 near their upper ends are provided with arcuate-shaped slots 24, through which project pivot pins 25, the same being passed through the cleats or U-shaped members 14 and the side boards 11 of the wagon body, the said pins being stationary and have connected thereto cam levers 26, the cam ends 27 of which are adapted to work against the inturned flanges 28 on the clamping cleats 22, so as to hold the latter against the bottom section 18 of the end gate for securing it between the said stationary and clamping cleats 19 and 22, respectively. However, upon swinging the cam levers 26 to releasing position, they will permit the clamping cleats 22 to be swung rearwardly and outwardly from the wagon body for the freeing of the lower section 18 which can be raised and removed from said body, thereby permitting the load of the wagon to be discharged at its rear end.

Secured to the outer face of the upper section of the end gate are vertical L-shaped reinforcing angle irons 29, the same being provided in their outturned flanges 30 with suitable alining openings, through which is passed a removable tie rod 31, the same being provided with threaded ends 32, which are passed through the stationary cleats 21 mounted upon the sections 12 of the top box, and also through the members 13 and said sections 12. Adjustably connected with the threaded ends 32 of the tie rod 31 are hand or lever nuts 33, which when worked inwardly on the tie rod 31 bind against the outer limbs of the U-shaped members 13, thereby securely and firmly fastening the top section 17 of the end gate between the cleats 16 and 21 carried by the sections 12 of the top box. Thus it will be seen that by loosening the nuts 33 on the tie rod 31, the upper section 17 of the end gate may be readily and easily detached or removed from between the cleats 16 and 21 on the sections 12 of the top box. Secured to the outer face of the lower section 18 on the end gate and in alinement with the reinforcing irons 30 are reinforcing angle or L-shaped irons 34, in which are pivotally connected loop handles 35 which permit the section 18 to be readily detached when the clamping cleats 22 have been swung inwardly for the freeing of the said section.

What is claimed is:

1. A device of the class described comprising a wagon body, stationary cleats fixed to the inner faces of the sides of said body, L-shaped clamping cleats pivoted at their lower ends to the inner faces of the side of said body adjacent said stationary cleats, said clamping cleats being provided adjacent their upper ends with arcuate slots, stationary pivot pins engaging said slots and said clamping cleats, and a removable end gate insertible between said stationary and said clamping cleats.

2. A device of the class described comprising a wagon body, stationary cleats fixed to the inner faces of the sides of said body, L-shaped clamping cleats pivoted at their lower ends to the inner faces of the side of said body adjacent said stationary cleats, said clamping cleats being provided adjacent their upper ends with arcuate slots, stationary pivot pins engaging said slots and said clamping cleats, a removable end gate insertible between said stationary and said clamping cleats, and cam members carried by said pivot pins and coöperative with said clamping cleats for locking the same in clamping relation to said end gate.

In testimony whereof I affix my signature in presence of two witnesses.

SWAN J. TILLEY.

Witnesses:
C. F. JOHNSON,
OSCAR ELMQUIST.

Copies of this patent may be obtained for five cents each, by addressing the "Commissioner of Patents, Washington, D. C."